United States Patent
Jackson et al.

(10) Patent No.: US 7,658,874 B2
(45) Date of Patent: Feb. 9, 2010

(54) POLYMER PELLETIZATION PROCESS AND APPARATUS

(75) Inventors: Richard Alan Jackson, Hockessin, DE (US); Dennis Jack Royer, Kennett Square, PA (US); Marion G. Waggoner, Landenberg, PA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 749 days.

(21) Appl. No.: 10/894,807

(22) Filed: Jul. 20, 2004

(65) Prior Publication Data

US 2005/0140044 A1    Jun. 30, 2005

Related U.S. Application Data

(60) Provisional application No. 60/491,003, filed on Jul. 30, 2003, provisional application No. 60/563,941, filed on Apr. 21, 2004.

(51) Int. Cl.
*B29B 9/06* (2006.01)

(52) U.S. Cl. ............... 264/142; 264/141; 264/143; 264/145; 264/151; 425/67; 425/68; 425/69; 425/310; 425/311; 425/313

(58) Field of Classification Search ............... 264/145, 264/148, 151, 141–143; 425/113, 202, 209, 425/67–69, 310, 311, 313
See application file for complete search history.

(56) References Cited

U.S. PATENT DOCUMENTS

| 3,516,120 | A | * | 6/1970 | Braun et al. ............... 425/67 |
| 4,678,423 | A | * | 7/1987 | Bertolotti ............... 425/311 |
| 4,728,276 | A | | 3/1988 | Pauley et al. |
| 5,948,336 | A | * | 9/1999 | Yoshida et al. ............... 264/142 |

FOREIGN PATENT DOCUMENTS

JP        05-253997    *    5/1993

OTHER PUBLICATIONS

Japanese Abstract JP 5-253997, Mitsubishi Kasei Corp.

* cited by examiner

*Primary Examiner*—Jeffrey Wollschlager
*Assistant Examiner*—Stella Yi
(74) *Attorney, Agent, or Firm*—Loretta Smith (57) ABSTRACT

An improved process for the pelletization of polymers is disclosed, using a die in which the die holes incorporate a reverse taper along at least a portion of the length thereof. Conditions for operation of an under melt cutter incorporating this die are also disclosed.

14 Claims, 5 Drawing Sheets

SECTION X-X

POLYMER PELLETIZATION PROCESS AND APPARATUS

CROSS REFERENCE TO RELATED APPLICATIONS

This application claims the benefit of U.S. Provisional Application No. 60/491,003, filed Jul. 20, 2003, and U.S. Provisional Application No. 60/563,941 filed Apr. 21, 2004.

FIELD OF THE INVENTION

The present invention relates to the startup of underwater melt pelletizers or cutters. More particularly, the present invention relates to processes for simpler and faster startups of such pelletizers and cutters by using a die whose die holes have a reverse taper at the exit side of the die. It also relates to an improved die assembly design for underwater melt cutters.

BACKGROUND OF THE INVENTION

Thermoplastics (TPs) are very important items of commerce. Typically they are formed into various parts and shapes by melt forming, that is melting of the TP, forming it while molten into a shape and then cooling the TP to a solid to "fix" it in that shape. In most melt forming machines, the TP is fed in the form of a pellet or granule, typically in the size range of 0.1 to about 0.7 cm (longest dimension). In order for most melt forming machines to work efficiently, it is preferred that the pellets or granules be free flowing and have a reasonably uniform size.

Many types of apparatuses have been developed to pelletize TPs. Such an apparatus should preferably produce uniform and readily flowing pellets, at low cost. One such type of pelletizing apparatus is the so-called "underwater melt cutter" (UMC), see for instance U.S. Pat. Nos. 2,918,701 and 3,749,539. When a UMC is operating properly, it is capable of producing large amounts of TP pellets which are uniform and free flowing. However, UMCs have a number of drawbacks, among these difficulty in pelletizing higher melting point (>200° C.) TPs or TPs that otherwise readily freeze to solids, intolerance to process upsets such as short interruptions in polymer flows, and sometimes difficult startups. Thus improvements that would minimize these and other difficulties with UMCs are desired.

U.S. Pat. No. 4,728,276 describes an "Underwater Pelletizer" with die holes having what appear to be a reverse taper. No mention is made of the effect of such die holes on a startup.

Japanese Patent Application 5-253997 describes a die whose holes have a reverse taper. The purpose of these holes appears to be minimization of die drips and their degradation in cutters which are not UMCs.

It is therefore an object of the invention to provide a die useful in an underwater melt cutter that minimizes various difficulties associated with the start up of UMC's. These and other objects, features and advantages of the invention as disclosed and claimed herein will become apparent upon having reference to the following detailed description of the invention.

SUMMARY OF THE INVENTION

There is disclosed and claimed herein a process for the startup of an underwater melt cutter for polymers wherein a molten polymer is forced through a die having an exit face and one or more die holes, and upon exiting said die holes said polymer is cut by one or more rotating knives, and wherein said polymer is underwater or in contact with water in the vicinity of the exit face of said die, wherein the improvement comprises:

(a) providing a die having one or more die holes, wherein said die holes have a reverse taper and said die in the vicinity of at least a portion of said reverse taper of said die holes, is maintained at a temperature that is at or above a melting point of said polymer, or if said polymer has no melting point said portion is maintained at a temperature that is at or above a glass transition point of said polymer, while said exit face is in contact with water;

(b) rotating said knives; and (c) after (a) and (b) have been accomplished forcing said molten polymer through said die holes no earlier than 5 seconds, preferably no earlier than 10 seconds, after said water is in contact with said exit face.

This invention also concerns an underwater melt cutter die assembly having a die plate or die body having one or more die holes through which molten polymer flows and having a polymer exit face, wherein the improvement comprises, said polymer exit face is in contact with a nonmetallic thermal insulator having a first far face opposite the face in contact with said polymer exit face, said first far face is in contact with a backup plate having a second far face opposite a face in contact with said nonmetallic thermal insulator, and said second far face is in contact with an abrasion resistant material.

Also disclosed is a process for underwater melt cutting using the underwater melt cutter die assembly described immediately above.

The invention will become better understood upon having reference to the drawings herein.

BRIEF DESCRIPTION OF THE DRAWINGS

FIG. 3(a, b and c) and section X-X of FIG. 3a shows a die similar to that used in Examples 1-6.

DETAILED DESCRIPTION OF THE INVENTION

UMCs are useful pieces of equipment for pelletizing polymers, especially TPs. One problem with them is that their startups tend to be difficult, time consuming, and often wasteful of the polymer being cut. By a "startup" herein is meant starting up the UMC after a long and/or scheduled shutdown, or restarting the machine after a relatively short process outage, for example a brief stoppage in the flow of polymer to the die. Startups from such brief outages will also be termed "restarts" herein. Therefore UMCs are usually used in continuous or nearly continuous operations, and not batch operations where there may be shutdowns between relatively short operating periods.

When the polymer flow through the die holes stop, typically the polymer being cut in the UMC freezes at the exit end of the die holes because the cool water contacts this polymer. A typical restart procedure would involve the steps of:

1) Stopping the water circulation (however the polymer has already frozen off at the die hole exits).

2) Pulling back the cart which holds the cutter blades and circulating water.
3) At this point with the water gone the polymer in the die holes usually remelts and often starts to drool, so the drooling polymer is removed by wiping the die face.
4) If the polymer is not thermally stable it may be desirable to purge some of the polymer through a purge valve in the polymer supply line and/or through the die holes.
5) Cleaning the die face again.

Then very quickly:

6) Returning the cart to the operating position and latch it to the die assembly.
7) Pushing the automated start button, which in rapid sequence (a few seconds at most) circulates water to the exit face of the die, starts the cutting blades rotating and starts the polymer flow. If not done in a precise sequence in a short amount of time the UMC will likely freeze up again, and/or a large amount of uncut polymer will occur in the cart, and/or the cutting blades may be fouled.

The procedure detailed above has many drawbacks, among them:

Polymer is lost in purging and drooling.

The process is time consuming and often much longer than the original cause of the shutdown, causing loss of production time.

Operating the UMC safely may be difficult because of the exposure of operators to hot molten polymers, and/or fumes from the hot molten polymer, and/or the cooling water which may itself be hot (cause burns to humans), and/or the polymer or fumes from the hot die may catch fire (particularly if the melting point of the polymer is very high).

The present process, using the specified die, largely avoids all these problems, especially for restarts. It utilizes the reverse taper die holes together with certain other features of UMCs to provide easy startup. By "reverse taper die holes" is meant that the die hole at the (polymer) exit side of the die plate is wider in diameter than along the rest of the die hole and tapers to a smaller size hole as one goes from the exit face of the die plate towards the (polymer) entrance face of the die plate. These die holes need not taper throughout the length of the die hole, but must taper on the die plate exit side. Typically the depth of the taper will be at least about 0.5 cm to about 5 cm. By "depth of taper" is meant the length along the axis of the hole (e.g., length of section 6 in FIG. 1 or length of sections 26, 29, and 31 in FIG. 2). It is noted that many UMC dies shown in the literature have die holes whose cross section decreases in going from the entrance face to the exit face, hence the term "reverse taper" in this instance describes dies wherein the die hole cross section increases in the same direction.

Figure 1:
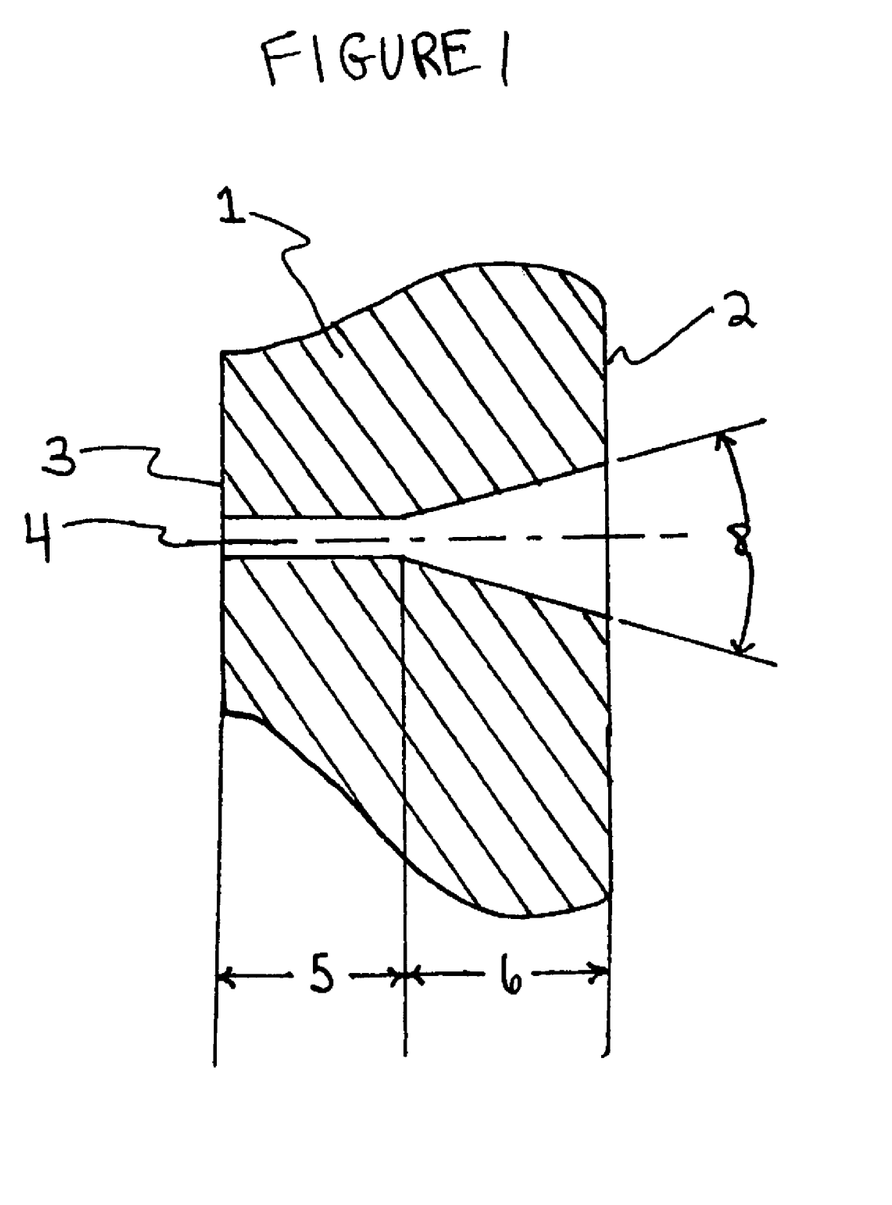
FIG. 1 is a section of part of an underwater melt cutter die, which illustrates a reverse taper die hole in the die.

A cross-section of part of a die plate, the cross section being through a center line of a reverse tapered die hole, is illustrated in FIG. 1. The die plate 1 has an exit face 2, where the polymer (not shown) exits the die (hole), and an entrance face 3 where the (molten) polymer enters the die hole 4. In this particular instance, 4 is straight over part of its length, zone 5, and has a reverse taper over part of its length, zone 6. The tapered portion has a "taper angle" 8. While not critical it is preferred that the taper angle is at least 0.1°, more preferably at least about 0.2°, especially preferably at least about 0.5°, and very preferably at least about 1.0°. It is also preferred that the taper angle is about 10° or less, more preferably 5° or less, and especially preferably about 3.0° or less. It is to be understood that any minimum and maximum taper angles given above may be combined to give a preferred taper angle range.

The taper angle may change but the change should preferably not be a large discontinuous change, and in proceeding from 3 to 2 through 4, the taper angle should remain the same or increase. If the taper angle is constant it is the angle formed by opposite sides of the die hole in zone 6, and the taper angle is included in a plane which also includes the axis of the die hole. If the taper angle changes and has different values in different segments, then each segment shall be similarly measured. The taper angle may also change constantly, in which case the taper angle at any point is measured in a similar way using a lines perpendicular to the tapered surface of 4 at that point.

Typically a die hole or orifice such as 4 will have a circular cross-section although the cross-section may be other shapes. These noncircular cross-sections may take any of a variety of shapes and are limited only by the ability to machine or otherwise manufacture them into the die plate, and so long as the die hole with the selected shape can be formed with a reverse taper therealong. Typically such a reverse taper section will be congruent with the shape of the rest of the die hole. The reverse tapered section will typically have a cross-section which is congruent with the cross-section of the rest of the hole, although that is not necessary. Circular cross-sections are preferred. Typical diameters for circular cross-sections are about 0.05 to about 0.7 cm.

The die hole or orifice may not be a monolithic structure, that is it may not be formed from a single piece of material. For instance if the die is to be used with compositions that are very abrasive, such as those containing glass, the die hole may be formed partially by the die body and an insert into the body, the insert being made from an abrasion resistant material such as tungsten carbide. The insert may form the whole length of the hole or be part of it. In any event the taper angle and reverse taper configuration of the die hole overall, including that section formed by the insert, must meet the necessary limitations described herein, and also preferably has the preferred features described herein.

Figure 2:
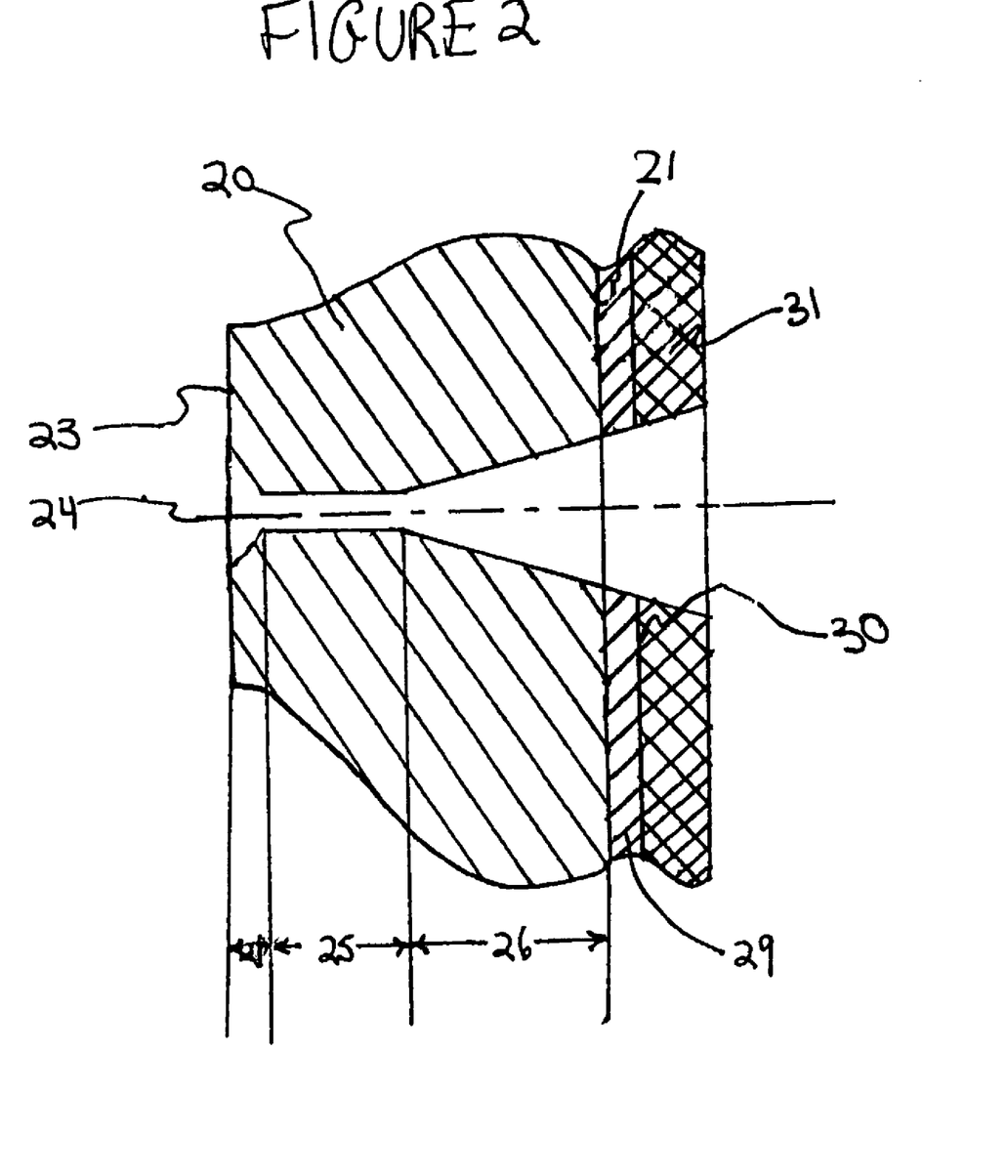
FIG. 2 is the same as FIG. 1, but illustrates additional optional parts of the die.

FIG. 2 shows a similar die hole as FIG. 1, including a die plate 20 with an exit face 21, where the polymer (not shown) exits the die (hole), and an entrance face 23 where the (molten) polymer enters the die hole 24. In this particular instance, 24 is straight over part of its length 25, and has a reverse taper over part of its length 26. 24 also has a "regularly" tapered section 27 at and near 23, which may in some cases may facilitate polymer flow. On and in contact with the surface of 21 and having a hole collinear with 24 is an layer of insulation 29 which insulates the die from the water of the water bath. 29 has an outer surface 30 which is in contact with a layer of material 31 having excellent abrasion resistance and a hole collinear with 24. 31 acts as a wear resistant surface which is contacted by the knives (not shown) of the UMC. The knives cut the polymer at or near this surface of 31. If 29 and/or 31 are present, then the holes through these components should also preferably be reverse tapered. If 29 and/or 31 are very thin, not having a reverse taper will not significantly affect the performance of the die. In other words the reverse taper should extend from somewhere within 20 to the surface at which the polymer emerges from 24 and/or is cut.

Figure 4:
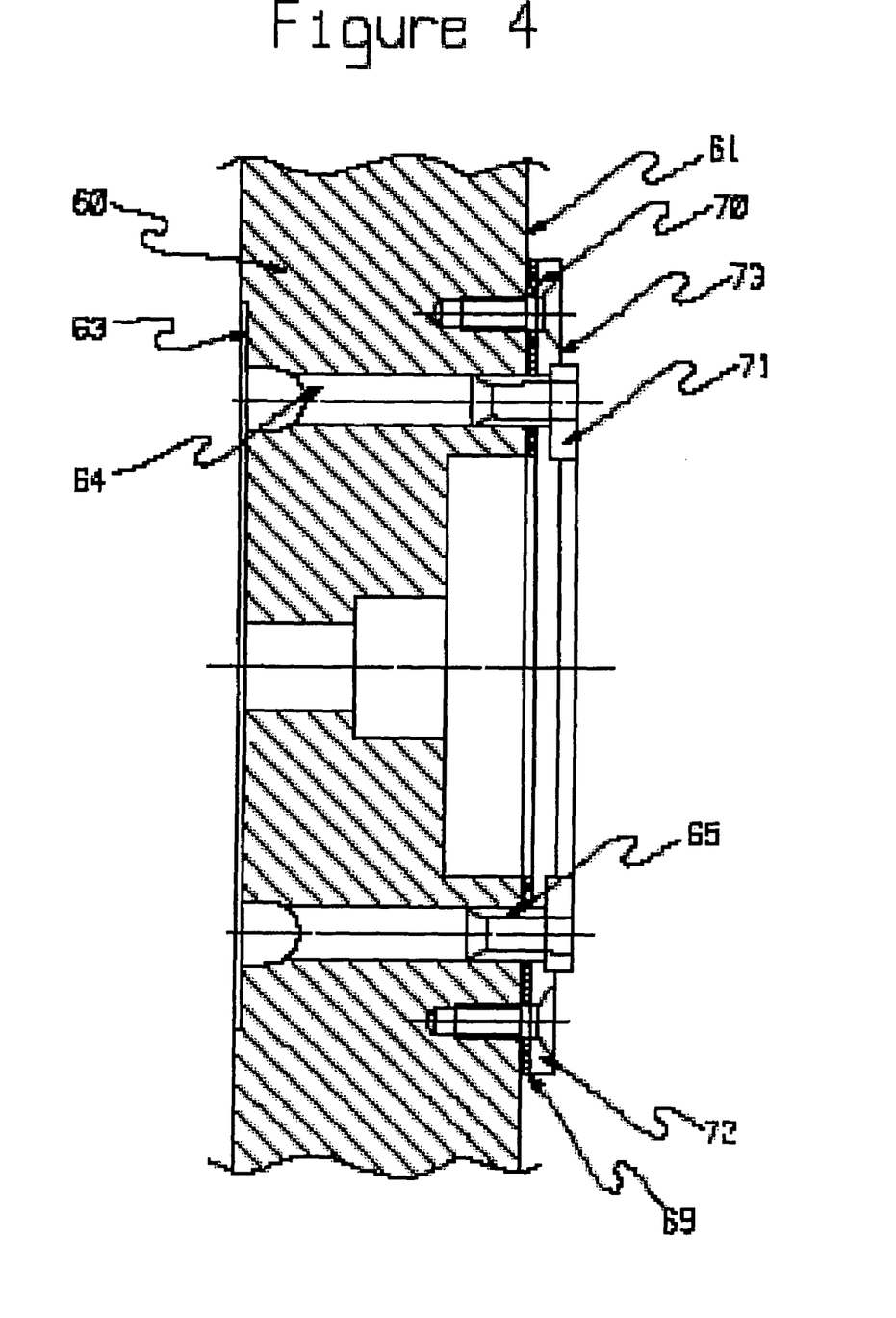
FIG. 4 is similar to FIG. 2, but shows a preferred configuration for an UMC die that thermally insulates the die from the cooling water of the water bath.

A preferred variation of the die assembly shown in FIG. 2 is shown in FIG. 4, which is a cross section similar to that of FIG. 2, but showing only the central part of the die plate. This variation may be used with a die (assembly) having reverse taper holes or with a die (assembly) have straight or "regularly" tapered holes also, in a process to pelletize TPs using a UMC. Thus FIG. 4 shows a die plate 60 with an exit face 61, where the polymer (not shown) exits the die (hole), and an entrance face 63 where the (molten) polymer enters the die hole 64. In this particular instance, 64 is straight over its length, and has an insert 65 in part of its length near 61. 65 has a reverse tapered section over most of its length. On and in contact with the surface of 61 and having a hole collinear with 64 is an layer of preferably nonmetallic insulation 69 which insulates the die from the water of the water bath, and has a hole collinear with 64. 69 has an outer surface 70 which is in contact with a layer of a relatively structurally strong material 72. 72 has an outer surface 73 which is in contact with 71 which has excellent abrasion resistance (sometimes called a hard face) and a hole collinear with 64. 71 acts as a wear resistant surface which is contacted by the knives (not shown) of the UMC. The knives cut the polymer at or near this surface of 71. The holes through 69, 71 and 72 should also preferably be reverse tapered. If 69 and/or 71 and/or 72 are very thin, not having a reverse taper will not significantly affect the performance of the die. In other words the reverse taper should extend from somewhere within 60 to the surface at which the polymer emerges from 64 and/or is cut.

In FIG. 4, 69 may be a material which is brittle and/or of low strength, since it preferably is a nonmetallic material such as mica, a glass or ceramic, a thermoplastic or a thermoset resin (all of these should have a relatively high melting point so they don't melt or soften at the die operating temperature). This means attaching 71 (which itself may be brittle) to the die body, for example by bolts through 69, may be very problematic at best, since cracking or other structural failure of 69 and/or 71 is likely. In order to avoid this problem, 71 is attached to a structurally strong (and relatively nonbrittle) material (72) such as steel or other metal, for example by brazing, welding or bolting. Then 72 may be attached to the die body by bolting through 69 (not shown) or by a collar bolted to the die plate 60 (not shown). In other words 72 may be thought of as a backing plate for 71, to be mounted between the relatively weak and/or brittle nonmetallic heat insulator 69 and 71. This type of configuration has the added advantage of allowing easy change of 69 and/or 71, if for example it is desired to change the die hole size (diameter) to produce different sized pellets.

Preferably 69 has a heat conduction (through the thickness of 69) of about 3 W/m° K or less, more preferably about 1.0 W/m° K or less. 69 should be thick enough so that "excess" cooling of the die body by the water of the cooling bath does not take place. If reverse taper die holes are being used this means the die assembly is able to provide enough heat so that the die may be started by the simplified procedure described above. If reverse taper die holes are not present, it simply means the die may operate in the normal fashion for UMC dies. This thickness will depend on the polymer being cut (in particular is melt temperature), the configuration of the die, the power of the die heater(s), and other factors, and is easily determined by simple experimentation. 72 should be thick enough to provide the needed structural strength so that 71 has a low tendency to break, and can be determined by typical mechanical design principles.

The underwater melt cutter die assembly of the type shown in FIG. 4 may be used for cutting thermoplastics in a normal manner as typically used for underwater melt cutters. The improved thermal insulation of the die body when water is in contact with the exit face allows smoother operation (for example less chance of the polymer freezing off), and/or the cutting of higher melting polymers, etc.

By in "water in contact with the exit face" is meant water in direct contact with the exit face or water in contact with an item which itself or through contact with one or more other items is in contact with the exit face. For instance, in FIG. 1 the water may be in contact with exit face 2. In FIG. 2, the water may be in contact with a die exit face if 29 and 31 were not present, if 29 was present but not 31 then the water would be in contact with 29, and if just 31 and not 29 were present or if both were present then the water would be in contact with 31. In all of these instances the water would be considered in contact with the exit face.

When there is no reverse taper then the hole at the exit end may be straight. If the polymer flow stops, the water contacting the polymer in the hole at or near at the exit end and causes the polymer to freeze (solidify). Even if the polymer in the interior of the die body remains molten, the solid polymer at the exit end of the hole prevents any more polymer flow unless it is melted. While enough (very high) pressure may possibly be applied to force the solid plug out, the equipment would have to be built to withstand such pressures and would be prohibitively expensive. Hence the need for a relatively complicated and difficult starting procedure described above.

However when the hole has a reverse taper, the polymer preferably need only be melted to somewhere (referring to FIG. 1) within zone 6, the solid polymer may be "popped out" from the hole easily, much as a tapered stopper may be removed from a wine flask. Thus only relatively moderate pressures, in most instances those already obtainable with currently available equipment, are needed. This greatly simplifies startups, and especially restarts, and this is illustrated below.

In continuous processes, probably one of the most common reasons for a shutdown of an UMC is a brief (for instance up to an hour) interruption in the pelletizing process. For instance this may be caused by a brief electrical or mechanical failure in any part of the system, a blockage in the polymer supply line(s) or solid pellet handling line(s), etc. With a die having reverse taper holes the UMC itself, particularly the water circulation, die heating, and rotation of the knives, may then be left on. The polymer near the exit surface of the die will freeze, but if the polymer is still molten somewhere within the reverse tapered section of the die hole, polymer flow may simply be restarted after a short outage and the UMC will usually restart. Some off-sized pellets may be produced, and they may be separated by size classification. If the polymer being pelletized is not too thermally stable and the outage is more than brief, one may want to divert molten polymer and/or solid pellets from first quality product until any possibly degraded polymer is removed from the system, or the heaters may be turned off temporarily. This procedure is simple, time saving and results in a minimal loss of polymer.

In batch processes shutdowns, or at least polymer flow interruptions, between batches are often deliberate. In these instances the easy startup features of the present dies are also obviously advantageous.

For longer shutdowns or startups after long periods, such as scheduled maintenance shutdowns, the procedure can be slightly different. If the same polymer is being cut before and after the shutdown, and particularly if the polymer is thermally stable, it may not even be necessary to clean out the UMC. The UMC, especially the die plate and polymer handling lines, may simply be reheated, and the water and rotating knives be turned on before the polymer can drool from the die plate holes. When the die plate reaches operating temperature (this presumes at least some of the polymer in the reverse taper section of the die holes is melted) and the rest of the system is ready, the polymer flow may be turned on. This procedure can also be used if it is necessary to cool the die even on a short shutdown if it is necessary because the polymer being not is not particularly thermally stable. If the die holes have been cleaned and are empty some molten polymer should be placed into the holes (for example by filling the die with melted polymer, which can solidify) before exposing the exit face of the die to the water. It is preferred that water not get into the die holes, and especially the molten polymer lines behind the holes, as (superheated) steam may be forcefully expelled through the die holes. After there is polymer in the die holes, the UMC and pelletizing system may be started up as described above.

Other variations and methods for startups are evident to the artisan and may also be used.

As noted above, a preferred conditions for easy startup is to have molten polymer in at least part of (referring to FIG. 1) zone 6, the reverse taper zone of the die hole(s). Achieving this, even with no polymer flow, means balancing heat loss from the polymer in the die, and the die itself, with heat gain of the polymer from the means for heating the die, particularly in zone 6. At or near the exit face (2) of the die, the major heat loss from the die, and the polymer in the die hole, is with the water near or in contact with 2 and the surface of the polymer exposed at or near the exit end of the die hole. However since polymers, and most polymer compositions, are good thermal insulators, heat loss of the polymer in sections of the die hole more and more remote from the polymer surface in contact with water is relatively smaller and smaller. Thus if the die plate (1) itself, especially in the vicinity of the die hole, is kept hot enough, enough heat can be supplied to the polymer to keep it molten in at least some of zone 6. Items that increase heat flow to the polymer (in other words tend to keep the polymer hotter and melted) include higher die temperatures, increased thermal conductivity of material of 1, increased circulation speed of a die heating fluid (see below), a longer zone 6, insulating 1 from heat loss, and vice versa. An item that decreases the ability to supply enough heat to the polymer include larger temperature difference between the melting point or glass transition temperature of the polymer and the temperature of the water (in effect this often means the higher the melting point or glass transition temperature of the polymer the more difficult it is to maintain molten polymer in zone 6), and vice versa. By balancing these factors, and with little experimentation, UMC systems that have easy startups may be readily configured.

Herein in the vicinity of the die holes (orifices) at startup the die should be at or above the melting point of the polymer, particularly in at least a portion of zone 6, the reverse tapered zone. If the polymer has no melting point (is amorphous) then the vicinity of the die holes should be at or above the glass transition temperature of the polymer. If the polymer has more than one melting point or glass transition temperature, the highest melting point or highest glass transition temperature is used. Melting points and glass transition temperatures are measured by method ASTM Method D3418. Melting points are taken as the maximum of the melting endotherm, and glass transition temperatures are taken as the midpoint of the transition. Melting points and glass transition temperatures are measured on a second heat. Preferably on a startup the die in the vicinity of the die holes is at least about 5° C. above, more preferably at least about 10° C. above, and especially preferably at least about 20° C. above, the highest melting point of the polymer. In order to speed up the startup process, it may be useful to "spike" the control temperature of the die heaters for a short period of time to increase the die temperature rapidly, especially if the polymer being used is thermally stable. If an amorphous polymer (no melting point) is being used, preferably on a startup the die in the vicinity of the die holes is at least about 25° C. above, more preferably at least about 50° C. above, and especially preferably at least about 100° C. above, the highest glass transition point of the polymer.

By a "melted", "molten" or "liquid" polymer herein is meant a polymer having a temperature at or above its highest melting point, or if the polymer has no melting point (is amorphous) is at or above its highest glass transition temperature. Molten polymers may be "forced" through the die and die holes by any number of methods well known in the art, for instance using a pump such as a gear pump or a screw pump, pressurizing the molten polymer above ambient pressure (as with gas pressure above a partially filled tank of molten polymer), extruder, or gravity induced flow. The die may be heated by any method known in the art. For instance it may be heated by: a hot fluid(s) (gas and/or liquid) circulating through the die such as saturated or superheated steam, hot oils of various kinds, and Dowtherm® and similar materials; and/or electrical heaters either within the die body or on the outside, for instance external band heaters and/or internal cartridge heaters.

Any polymer which is solid above 0° C. and may be melted can be cut by the present method. The melt viscosity of the polymer is preferably in a range where the molten polymer may be reasonably easily forced through the die holes.

Useful type of polymers and specific polymers within those classes include: polyesters, such as poly(alkylene terephthalates) such as poly(ethylene terephthalate), poly(1,3-propylene terephthalate), poly(1,4-butyleneterephthalate), poly(alkylene isophthalates/terephthalates), poly(alkylene 2,6-naphthalates) such as poly(ethylene 2,6-napthtalate), copolymer of terephthalic acid, 1,4-cyclohexanedimethanol and copolyesters thereof; polyamides such as nylon-6, nylon-6,6; polyolefins such as polyethylene, polypropylene, polystyrene, copolymers of ethylene and α-olefins, especially linear α-olefins, copolymers of ethylene with (meth)acrylate esters and/or methacrylic and/or acrylic acids and salts thereof, and copolymers of the above named olefins; acrylonitrile-butadiene-styrene copolymers; fluorinated polymers, including copolymers of polytetrafluoroethylene, perfluorinated polymers, poly(vinyl fluoride), copolymers of ethylene and vinylidene fluoride, and poly(vinylidene fluoride); poly(imide ethers); polysulfones such as polyphenylene sulfone; polysulfides such as poly(phenylene sulfide); poly(ether-ketones); poly(ether-ether-ketones); thermotropic liquid crystalline polymers such as polyesters, poly(ester amides), and poly(ester-imides); and poly(vinyl chloride). Blends of two or more of these and/or other individual polymers and/or polymer types may also be used.

The polymers which are used in the present process may contain any additives which are normally added to thermoplastics polymers, such as fillers, reinforcing agents, pigments, antioxidants, plasticizers, brightening agents, antiozonants, dyes, and heat stabilizers. Useful specific materials include glass in the form of fiber, microspheres, milled glass, and ground fibers, clay(s), mica, talc, and other minerals, carbon (graphitic and nongraphitic) in the form of powder, fibers and fibrils, organic fibers, fibrils and fibrids such as aramids and liquid crystalline polymer fibers, titanium dioxide, powdered metals, short lengths of metal wires and fibers, and powdered organic materials such as thermoset polymers. These materials may be present in conventional amounts in these compositions.

Figure 3A:
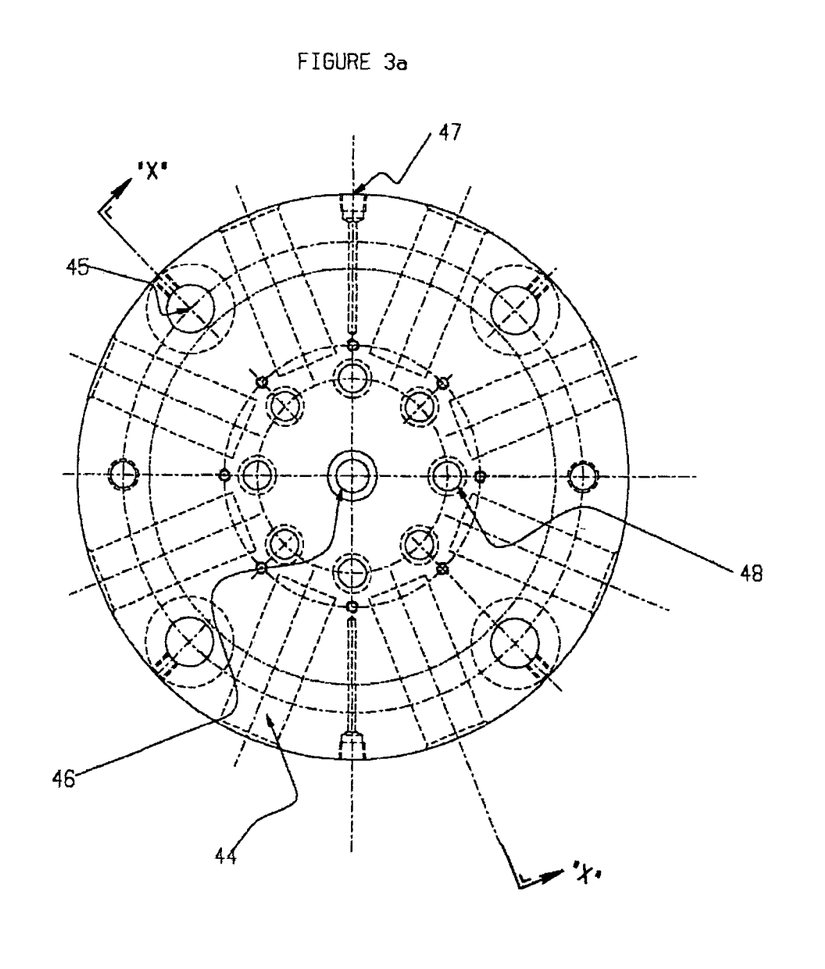

FIG. 3a shows a front view of a die, together with a cross section (XX) of this die. The die has a die body 41, having entrance face (surface) 42, exit face (surface) 43, eight cavities (for electric heaters) 44, bolt holes (for mounting 41) namely 45 and 46, 2 cavities (for mounting thermocouples)

Figure 3B:
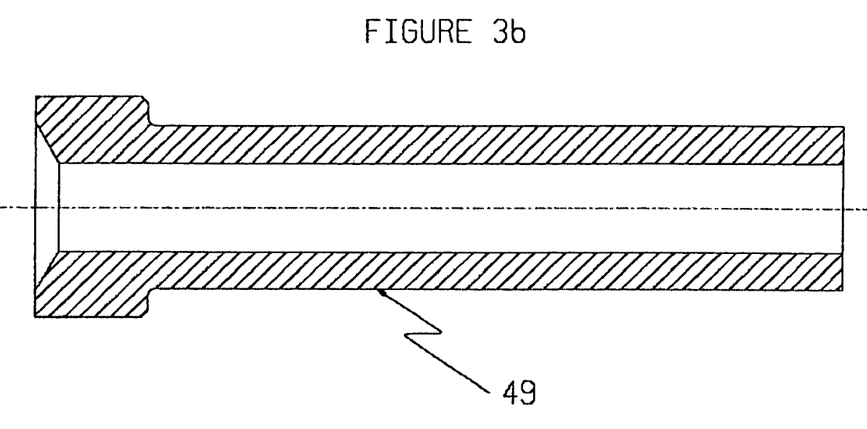
Figure 3C:
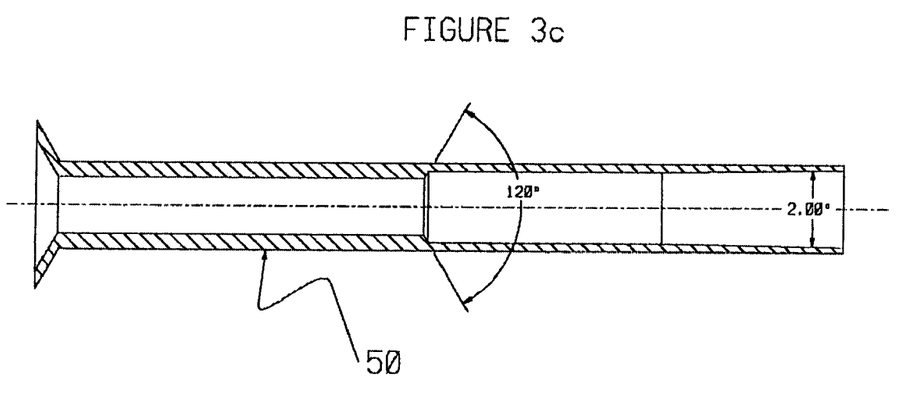

47, and eight die holes 48. Shown in FIG. 3b is a die hole insert holder 49, which fits into 48. Shown in FIGS. 3b and 3c is a die insert 50 which fits into 49. By having separate pieces for 49 and 50 the effective diameter of the die hole may be readily changed. Referring to cross section (XX) of FIG. 3a and FIGS. 3b and 3c, molten polymer enters 50 in the vicinity of 42 and flows through 50 to the vicinity of 43, and exits 50 near 43. Not shown are a thermal insulator on or near 43 in the vicinity of the exit end of 50, or an abrasion resistant surface for the knives to rotate against. The materials for all of 41, 49, and 50 should have a relatively high thermal conductivity, >50 W/m° K. In some instances it may be preferable that 50 not only have a relatively high thermal conductivity, but also be relatively abrasion resistant, and (high thermal conductivity) tungsten carbide (60-170 W/m° K) is suitable for this use. Other parts of the die or attachments thereto which may be present, such as mounting bolts, electrical heaters, thermocouples, clips to hold the electrical heaters, etc., are not shown. As can be plainly seen from these Figures, there is a highly thermally conductive path from the electrical heaters, the heat sources for this die, to the inner surfaces of 50 which are in contact with the molten polymer. It is noted that while the electrical heaters would usually be designed to contact the walls of their cavities as much as possible, in some places there may be a small air gap between the heaters and 41, for the purposes herein this often unavoidable gap is still considered to be part of a relatively highly thermally conductive path.

Note also that FIG. 3c shows a die insert having a reverse taper (see below), with a taper angle of 2.00°.

EXAMPLES

Procedure

Die A was used in some of the Examples. This die was made from GlidCop® Grade AL-15. This die was similar to the die shown in Figure (except for some minor physical variations of an inconsequential nature; otherwise the character and performance of the die is the same as that in FIG. 3) and has an overall diameter of 22.86 cm and was 6.35 cm thick. The die was bolted to the extruder end. The eight equally spaced die holes were fitted with die inserts such as 50, or be plugged so that less than 8 dies holes were in operation. The die inserts were made of tungsten carbide. The die was also equipped with a layer of thermal insulation over the exit end of the die holes which was made from titanium carbide with a carbon steel backplate. Total thickness of the titanium carbide and the backplate was 4.75 mm. In the inserts 50 the taper angle, 8 (see FIG. 1), was 2°, a zone similar to 5 was 6.13 cm long with a taper (not reverse taper) angle of 1.724°, and a zone similar to 6 was 6.99 mm long, including the thickness of the titanium carbide and steel backplate layers (the die holes through the thickness of these layers also had the reverse taper). At the entrance end of the die hole the diameter was 5.54 mm, and at the exit end (at the outside face of the titanium carbide) it was 3.94 mm in diameter.

Die B was used in some of the Examples. This die was made from carbon steel. This die was similar to the die shown in FIG. 3 except for some minor physical variations of an inconsequential nature, but the exit face, thermal insulator, backer plate, hard face and inserts are as shown in FIG. 4. It had an overall diameter of 22.86 cm and was 4.20 cm thick. The die was bolted to the extruder end. The eight equally spaced die holes were fitted with die inserts such as 66, or could be plugged so that less than 8 dies holes were in operation. The die inserts were made of 360 brass. The die inserts had a reverse taper of 3° over a length 1.1 cm. and at the outer surface of the hard face, the hole diameter was 0.549 cm. The die hole (in the die body) was 0.775 cm in diameter. The TiC hard face was 0.424 cm thick, the carbon steel backer plate was 0.305 cm thick overall, and the mica thermal insulation was about 1.3 mm thick when compressed.

In the Examples certain polymers were used, and these are described in Table 1. All these polymers (except the LCP) are available from E.I. DuPont de Nemours & Co., Inc., Wilmington, Del., USA.

TABLE 1

| Polymer Designation | Polymer | Filler** (% by wt.) |
|---|---|---|
| Rynite* 5246 | poly(ethylene terephthalate) | glass fiber (35) + rubber toughener |
| Rynite* 5253 | poly(ethylene terephthalate) | glass fiber (45) |
| Rynite* 530 | poly(ethylene terephthalate) | glass fiber (30) |
| Rynite* 415 HP | poly(ethylene terephthalate) | glass fiber (30) + rubber toughener |
| Rynite* FR515 | poly(ethylene terephthalate) | glass fiber (30) + flame retardants |
| Zytel* 70G35 | nylon-6,6 | glass fiber (35) |
| Delrin* 100 | acetal [poly(oxymethylene)] | none |
| LCP | *** | none |
| Zytel* 70G33 | nylon-6,6 | glass fiber (33) |

*Registered Trademark
**Not including minor additives such as antioxidants
***Liquid crystalline polyester derived from hydroquinone/4,4'-biphenol/terephthalic acid/2,6-naphthalene dicarboxylic acid/4-hydroxybenzoic acid (50/50/70/30/320 molar ratio)

Examples 1-6

In these examples Die A was used to underwater pelletize various polymer formulations, with 8 die holes. In all cases the die holes had a reverse taper of 2°. The polymer was fed to the die by an extruder which melted the polymer composition. The polymer melt temperature was maintained at that recommended by the polymer manufacturer (or above the melting point) in the extruder. At some point the polymer flow was interrupted and the polymer allowed to freeze at the exit end of the die holes. The melt cutter was then restarted (assuming it already had polymer in it) by attaching the cutter cart (which contains the knives and cooling water) and starting the knives and cooling water circulation), raising the die temperature to about the polymer melting point. The polymer feed extruder was started and polymer feed to the extruder was initiated. A diverter valve on the exit end polymer feed extruder, which had been set to divert molten polymer from the pelletizer, was now set so that molten polymer was fed to the pelletizer (die) and at this point pelletization started. In some instances when polymer feed was started it was started at a reduced rate and then ramped up to the final desired rate. In all the Examples listed in Table 2, startup, even though the die was in the circulating water, was smooth. The pressure needed to start the flow of polymer through the die using this simplified startup procedure is given in Table 2, as is the steady state pressure during pelletization, the die and cooling water temperatures, and the polymer used.

TABLE 2

| Ex. | Polymer | Die ° C. | Water ° C. | Throughput Rate kg/h/hole | Die Hole Pressures, MPa | |
|---|---|---|---|---|---|---|
| | | | | | Hole Opening | Steady State Operating |
| 1 | Zytel ® 70G35 | 300-340 | 61-91 | 57-65 | 9.8 | 8.8-9.5 |
| 2 | Rynite ® 530 | 280-320 | 60-90 | 57 | 6.2 | 6.8-7.0 |
| 3 | Rynite ® 5253 | 280 | 60-90 | 57 | 11.0 | 11.0 |
| 4 | Rynite ® 5246 | 280 | 60-90 | 57 | 5.5 | 5.1-5.4 |
| 5 | Rynite ® 415 HP | 232 | 60-90 | 57 | 7.6 | 7.5 |
| 6 | Rynite ® FR515 | 240 | 60-90 | 57 | 3.4 | 4.1 |

Example 7

A commercial 50 hole underwater melt cutter die was adapted for use with reverse taper die holes. The die body was made from carbon steel and the body was heated by electrical resistance heaters. Each die hole was adapted so that two piece die hole liners were fitted into each die hole. At the entrance face (similar to 42 in FIG. 3a) was a straight hole liner that was 3.58 cm (1.41") long and which had a circular hole 3.00 mm (0.118") in diameter, called the entrance section. Immediately downstream (polymer flow) of this entrance section was an exit section 2.53 (0.995") long, having a circular hole 4.06 mm (0.160") in diameter. The exit end of the exit section was flush with the exit face (similar to 43 in FIG. 3a), and was exposed to the cooling water of the pelletizer. The exit section could be changed, and hole was either straight or had a reverse taper. If it had a reverse taper it was formed by reaming the straight hole to the desired taper angle so that the taper angle extended 6.35 mm (0.25") deep in from the exit face. Molten polymer was fed to the pelletizer die using a gear pump. The polymer was a liquid crystalline polymer (LCP) and was a copolymer made from hydroquinone/4,4'-biphenol/terephthalic acid/2,6-napthalene dicarboxylic acid/4-hydroxybenzoic acid, 50/50/70/30/320 molar parts, which had a melting point of about 335° C.

To start polymer flow, the die, which was filled with polymer, was heated above the melting point of the LCP, and polymer upstream of the die was (already) melted. The "cutting cart" containing the rotating knives and water bath, with the water bath full and circulating, was put into place. After the die was sufficiently heated the gear pump was turned on. The pressure required to open the die (i.e. start polymer) flow was measured, but the reported pressures may be somewhat low, since pressure spikes may have occurred.

When the exit section had a straight hole, pressure in excess of about 13.8 MPa (2000 psi) were needed to open the die, if the die opened at all, since sometimes it did not open. Furthermore, the cooling water temperature had to be maintained at about 90° C. or higher to allow the die holes to open. This is a safety problem as such hot water can easily burn an operator. Maximum pressure which could be safely generated in the system was about 16.5 MPa (2400 psi). When running in this mode, eventually the gear pump had to be replaced, and it is believed this damage was due to these high startup pressures. It was observed indirectly that often many of the 50 holes in the die were not opened by this procedure, and pellets size under a standard set of pelletizing conditions varied as a result.

When a reverse taper was present and the (reverse) taper angle was 2° startup occurred at about 10.3-13.8 MPa (1500-2000 psi), and it was observed that the gear pump did not appear to be damaged by these startups. It was also observed that it appeared most if not all of the die holes would open upon startup, and pellet size was much more uniform (than a straight hole). This performance was obtained with cooling water temperatures of about 60° C. or a little less.

When the (reverse) taper angle was 3°, it was noticed that the number of holes which opened again appeared that often many of the holes in the die did not open. Before initiating a startup (with a hot die) the cutting cart was removed and the ends of the die holes observed. It appeared that in some holes the polymer frozen in the part of the exit section where the reverse taper was had fallen out. As a result was apparently in contact with polymer in the straight length of the exit section. This shows that the taper angle and tapered section length for optimum operation needs to be determined for each polymer composition to be cut under a given set of conditions. This may be readily determined by routine experimentation, particularly using die hole inserts.

Examples 8-10

In these examples Die B was used to underwater pelletize various polymer formulations, with 2 die holes. In all cases the die holes had a reverse taper of 3°, and the melt cutter cooling water temperature was 53° C. The polymer was fed to the die by an extruder which melted the polymer composition. At some point the polymer flow was interrupted and the polymer allowed to freeze at the exit end of the die holes. The melt cutter was then restarted (assuming it already had polymer in it) by attaching the cutter cart (which contains the knives and cooling water) and starting the knives and cooling water circulation), raising the die temperature to the set point. The polymer feed extruder was started and polymer feed to the extruder was initiated. A diverter valve on the exit end polymer feed extruder, which had been set to divert molten polymer from the pelletizer, was now set so that molten polymer was fed to the pelletizer (die) and at this point pelletization started. In some instances when polymer feed was started it was started at a reduced rate and then ramped up to the final desired rate. In all the Examples listed in Table 3, startup, even though the die was in the circulating water, was smooth. The pressure needed to start the flow of polymer through the die using this simplified startup procedure is given in Table 3, as is the steady state pressure during pelletization, the die and cooling water temperatures, and the polymer used.

TABLE 3

| Ex. | Polymer | Rate kg/h | Barrel Temp ° C. | Die Temp ° C. | Startup Pres. MPa | Steady State Pres. MPa |
|---|---|---|---|---|---|---|
| 8 | Delrin* 100 | 79 | 200 | 200 | — | 0.48-0.69 |
| 9 | LCP | 68 | 335 | 350 | 1.10 | — |
| 10 | Zytel* 70G33 | 68 | 290 | 290 | 3.03 | — |

*Registered Trademark

What is claimed is:

1. A process for the startup of an underwater melt cutter for polymers wherein a molten polymer having a melt temperature above 200° C. has been forced through a die having an exit face and one or more die holes, and upon exiting said die holes said polymer is cut by one or more rotating knives, and wherein said polymer is underwater or in contact with water in the vicinity of the exit face of said die, wherein the improvement comprises:
   (a) providing a die assembly having a die plate or a die body having one or more die holes, said die holes having a reverse taper, wherein the reverse taper has a taper angle of about 0.5° to about 5°,
   wherein the polymer in said die in the vicinity of at least a portion of said reverse taper of said die holes is at a temperature below the melting point of said polymer, or if said polymer has no melting point, at a temperature below the glass transition point of said polymer, thereby providing a solid polymer plug wherein the solid polymer plug seals the die plate, while said exit face is in contact with water;
   (b) rotating said knives; and
   (c) after (a) and (b) have been accomplished forcing said molten polymer through said die holes no earlier than 5 seconds after said water is in contact with said exit face.

2. The process as recited in claim 1 wherein said taper angle is about 1.0° to about 3.0°.

3. The process as recited in claim 1 wherein said die holes have a circular cross section.

4. The process as recited in claim 3 wherein a depth of taper is about 0.5 cm to about 5 cm.

5. The process as recited in claim 1 wherein said molten polymer is a polyester, a polyamide, a polyolefin, an acrylonitrile-butadiene-styrene copolymer, a fluorinated polymer, a poly(imide ether), a polysulfone, a polysulfide, a poly(ether-ketone), a poly(ether-ether-ketone, a thermotropic liquid crystalline polymer, or poly(vinyl chloride), or polymeric blends of two or more of these.

6. The process as recited in claim 4 wherein said molten polymer is a polyester, a polyamide, a polyolefin, an acrylonitrile-butadiene-styrene copolymer, a fluorinated polymer, a poly(imide ether), a polysulfone, a polysulfide, a poly(ether-ketone), a poly(ether-ether-ketone, a thermotropic liquid crystalline polymer, or poly(vinyl chloride), or polymeric blends of two or more of these.

7. The process as recited in claim 3 wherein said die holes have a diameter of about 0.050 cm to about 0.7 cm.

8. An underwater melt cutter die assembly having a die plate or die body having one or more die holes through which molten polymer having a melt temperature above 200° C. flows and having a polymer exit face, said polymer exit face is in contact with a nonmetallic thermal insulator having a first far face opposite the face in contact with said polymer exit face, said first far face is in contact with a backup plate having a second far face opposite a face in contact with said nonmetallic thermal insulator, and said second far face is in contact with an abrasion resistant material wherein the improvement comprises, said die holes have a reverse taper, wherein the reverse taper has a taper angle of about 0.5° to about 5°,
   wherein the polymer in said die in the vicinity of at least a portion of said reverse taper of said die holes is at a temperature below the melting point of said polymer, or if said polymer has no melting point, at a temperature below the glass transition point of said polymer, thereby providing a solid polymer plug wherein the solid polymer plug seals the die plate, while said exit face is in contact with water.

9. The die assembly as recited in claim 8 wherein said nonmetallic thermal insulator has a heat conduction of about 3 W/m° K or less.

10. The die assembly as recited in claim 8 wherein said nonmetallic thermal insulator has a heat conduction of about 1 W/m° K or less.

11. A process for the underwater melt cutting of a polymer, wherein molten polymer having a melt temperature above 200° C. has been forced through one or more die holes and as said polymer emerges from said die holes it comes into contact with water and is simultaneously cut at an exit face of said die holes, wherein the improvement comprises, an underwater melt cutter die assembly having a die plate or die body having one or more die holes through which molten polymer flows and having a polymer exit face, said polymer exit face is in contact with a nonmetallic thermal insulator having a first far face opposite the face in contact with said polymer exit face, said first far face is in contact with a backup plate having a second far face opposite a face in contact with said nonmetallic thermal insulator, and said second far face is in contact with an abrasion resistant material, wherein the improvement comprises, said die holes have a reverse taper, wherein the reverse taper has a taper angle of about 0.5° to about 5°,
   wherein the polymer in said die in the vicinity of at least a portion of said reverse taper of said die holes is at a temperature below the melting point of said polymer, or if said polymer has no melting point, at a temperature below the glass transition point of said polymer, thereby providing a solid polymer plug wherein the solid polymer plug seals the die plate, while said exit face is in contact with water.

12. The process as recited in claim 11 wherein said nonmetallic thermal insulator has a heat conduction of about 3 W/m° K or less.

13. The process as recited in claim 11 wherein said nonmetallic thermal insulator has a heat conduction of about 1 W/m° K or less.

14. The process as recited in claim 11 wherein said polymer is a polyester, a polyamide, a polyolefin, an acrylonitrile-butadiene-styrene copolymer, a fluorinated polymer, a poly(imide ether), a polysulfone, a polysulfide, a poly(ether-ketone), a poly(ether-ether-ketone, a thermotropic liquid crystalline polymer, or poly(vinyl chloride), or polymeric blends of two or more of these.

* * * * *

UNITED STATES PATENT AND TRADEMARK OFFICE
CERTIFICATE OF CORRECTION

PATENT NO.        : 7,658,874 B2
APPLICATION NO.   : 10/894807
DATED             : February 9, 2010
INVENTOR(S)       : Richard Alan Jackson It is certified that error appears in the above-identified patent and that said Letters Patent is hereby corrected as shown below:

Title page, item (*) Notice: should read as follows: Subject to any disclaimer, the term of this patent is extended or adjusted under 35 U.S.C. 154(b) by 990 days.

Signed and Sealed this

Seventh Day of September, 2010

David J. Kappos
*Director of the United States Patent and Trademark Office*